United States Patent [19]

Stein et al.

[11] Patent Number: 5,071,564

[45] Date of Patent: Dec. 10, 1991

[54] ARTICLE AND PROCESS FOR ABSORBING CONTAMINATING PRODUCTS

[75] Inventors: Claude Stein, Gouvieux; Daniel Duquenne, Fitze-James, both of France

[73] Assignee: Norsolor, France

[21] Appl. No.: 593,267

[22] Filed: Oct. 1, 1990

Related U.S. Application Data

[63] Continuation of Ser. No. 373,808, Jun. 29, 1989, abandoned.

[30] Foreign Application Priority Data

Jun. 30, 1988 [FR] France ............................ 88 08855

[51] Int. Cl.$^5$ .............................................. C02F 1/28
[52] U.S. Cl. ...................................... 210/680; 134/7; 210/693; 210/484; 210/502.1; 210/504; 210/506; 210/924

[58] Field of Search ............... 210/680, 693, 242.4, 210/502.1, 506, 924, 484, 504; 134/7

[56] References Cited

U.S. PATENT DOCUMENTS

| | | | |
|---|---|---|---|
| 3,607,741 | 9/1971 | Sohnius | 210/680 |
| 3,739,913 | 6/1973 | Bogosian | 210/924 |
| 4,011,159 | 3/1977 | Stein et al. | 210/693 |

*Primary Examiner*—Ivars Cintins
*Attorney, Agent, or Firm*—Finnegan, Henderson, Farabow, Garrett & Dunner

[57] ABSTRACT

Decontaminating article comprising a preagglomerated, powdered polymer of bicyclo[2.2.1]-2-heptene or its methyl derivative in at least one fine-mesh textile bag. The bag is at least partially filled with the polymer. The decontaminating article can be used to absorb a liquid contaminating product, in particular petroleum hydrocarbon.

16 Claims, No Drawings

ARTICLE AND PROCESS FOR ABSORBING CONTAMINATING PRODUCTS

This application is a continuation of application Ser. No. 07/373,808, filed June 29, 1989, now abandoned.

BACKGROUND OF THE INVENTION

The present invention relates to the field of decontamination of liquid or solid surfaces.

U.S. Pat. No. 4,366,067, French Patent No. 2,090,452, and European Patent No. 0,027,359 disclose articles intended to remove petroleum and oils present on the surface of a liquid. These articles include a wrapping or bag made of fabric or other material filled with birds' feathers, expanded perlite or closed-cell polyisocyanurate foam. However, the absorption of petroleum and of oils by these products is found to be clearly inadequate.

French Patent No. 2,288,709 describes a process for removing and recovering petroleum products, especially heavy hydrocarbons, spread on a liquid or solid surface, by bringing into contact with the petroleum product a finely divided polymer. The polymer produces with the petroleum product a film of sufficient strength to be pulled. The film is then removed by mechanical means.

A preferred polymer for use in this process is a polymer of bicyclo[2.2.1]-2-heptene or its methyl derivative. These polymers form with the petroleum hydrocarbons a coherent film which can contain up to 10 parts by weight of petroleum products per one part of polymer. According to this known process, the contact of the polymer with the petroleum product is brought about merely by sprinkling the polymer onto the surface of the product.

It has been found, however, that, in difficult meteorological conditions, which frequently prevail during emergency decontamination operations and especially in windy weather, it is disadvantageous to use these polymers by sprinkling them onto the sheets of petroleum products. A large part of the polymer powder is entrained outside the intended contaminated area and, consequently, reduces the effectiveness of the operation.

Moreover, in certain cases, especially that of transformer oils and that of light hydrocarbons such as domestic fuel oil, solvents, benzene, toluene and xylenes, the absorption capacity of the bicyclo[2.2.1]-2-heptene polymer can attain 15 and even 40 parts by weight of hydrocarbon per one part of polymer, while producing dry absorbates devoid of any subsequent sweating-out of the hydrocarbon, even under a pressure of 3 to 70 bars. However, such absorbates no longer have a sufficient cohesion to be capable of being removed in the form of a film which can be pulled. Rather, they tend to be semiagglomerated masses which are in the form of a gelatin. It is difficult to collect and remove this gelatin.

Finally, the use of the process according to French Patent No. 2,288,709 comes up against, on the one hand, the inadequacy of the kinetics of absorption of hydrocarbons and/or transformer oils by the bicyclo[2.2.1]-2-heptene polymer and, on the other hand, the aging of this polymer following prolonged storage.

SUMMARY OF THE INVENTION

The inventors have found that these problems as well as the problem of spreading the polymer in powder form in windy weather, the structure of certain absorbates, the kinetics of absorption and the aging of the polymer, can be overcome by virtue of the present invention. The present invention agglomerates the polymer, for example with a plasticizer agent, and encloses the preagglomerated, polymer powder in a fine-mesh textile bag. The ends of the bag can be closed after the polymer has been introduced.

The present invention, accordingly, is a decontaminating article that comprises a preagglomerated, powdered polymer of bicyclo[2.2.1]-2-heptene or its methyl derivative, and at least one fine-mesh textile bag at least partially filled with the polymer. The polymer can be preagglomerated by means of a plasticizing agent, such as oil.

The present invention also provides a process for absorbing a liquid contaminating product. The process arranges on the surface of the liquid at least one fine-mesh textile bag at least partially filled with a preagglomerated, powdered polymer of bicyclo[2.2.1]-2-heptene or its methyl derivative.

DESCRIPTION OF THE PREFERRED EMBODIMENT

The fine-mesh textile bag of the decontaminating article according to the invention can be made of any textile material, woven or nonwoven, chosen especially from synthetic materials such as nylon, polyester, polypropylene, viscose or mixtures thereof, or from natural materials such as cotton. It can also be made of a stretchable textile material. The bag can be of any shape such as, for example, a cushion or a sausage. The bag can have various dimensions which are adapted to the intended application. A preferred dimension is between about 3 centimeters and about 10 meters, without these numerical values being of a limiting nature.

To prevent the polymer contained in the bag from escaping, it is obviously important that the sides and/or the ends of the bag be closed by some means of closure. For example, the ends can be sewn, knotted or girt after filling with the polymer.

The bag which can be employed according to the present invention can also comprise, preferably fastened to at least one of its ends, at least one means of grasping. This grasping means can be an attachment or a knot allowing it to be pulled or towed by usual mechanical means.

Furthermore, it is also important that the textile bag forming part of the decontaminating article according to the invention has a fine mesh permitting the liquid contaminating product, such as petroleum, oil, light hydrocarbon or other, to enter the bag and come into contact with the agglomerated polymer. The mesh of the textile bag should be of a size which is smaller than the size of virtually all, preferably at least 95%, of the particles of the agglomerated polymer.

According to the present invention, the fine-mesh textile bag is at least partially filled with preagglomerated, powdered polymer of bicyclo[2.2.1]-2-heptene or its methyl derivative. Partial filling means that the bag need not necessarily be filled with the maximum quantity of polymer which the bag's geometrical shape could theoretically permit. By only partially filling the bag, an available residual volume is provided for the contaminating products which are to be absorbed by the agglomerated polymer. This also avoids the risk of rupture of the system for closing the bag, such as sewing or the like. The agglomerated polymer will preferably fill approximately from 20% to 80% of the theoretical volume of the bag.

The polymer contained in the bag can be in the form of a coarse powder with an apparent relative density of approximately between 0.15 and 0.50 and with a particle of size of approximately between 0.5 and 20 mm. The powdered polymers of bicyclo[2.2.1]-2-heptene or its methyl derivative are well known. During or after their manufacture, the polymers can have added to them fillers serving as so-called anticaking agents, such as silica, talc, calcium, sodium or zinc stearates and/or compatibility promoters.

According to the present invention, the polymer is to be agglomerated by means of plasticizing agent to impart some degree of plasticity to the polymer. These agents can be selected from liquid hydrocarbons; petroleum, paraffinic, aromatic or naphthenic oils; phthalates; adipates; sebacates; alkylbenzenes; and the like. The proportion of the plasticizing agent relative to the polymer may be between 0.5 and 50% by weight and, preferably, between 5 and 35% by weight.

Partial filling of the bag means, according to an embodiment of the present invention, that the material capable of absorbing liquid contaminants and filling the bag may be a mixture of preagglomerated bicyclo[2.2.1]-2-heptene polymer and of at least one other agent which absorbs contaminating products. The proportion of this other absorbent agent in the mixture being equal to not more than approximately 97% by weight, preferably equal to not more than approximately 40% by weight, of the mixture. The other absorbent agents for contaminating products which can be employed within the scope of this alternative form of the present invention include organic agents such as polymers based on an olefin (propylene, ethylene, and the like) or on styrene, fibrous or powdered, regenerated or otherwise, compact or expanded; vegetable agents such as scrap groundnut hulls or cereals; and mineral agents such as clay, chalk, silica, silicates, alumina or fly ash.

The present invention also provides a process for absorbing a liquid contaminating product. In the process, there is arranged on the surface of the liquid at least one fine-mesh textile bag at least partially filled with the above-described preagglomerated, powdered polymer of bicyclo[2.2.1]-2-heptene or its methyl derivative. The polymer can be preagglomerated by means of, for example, a plasticizing agent, such as an oil.

The process according to the invention employs the decontaminating article described above to absorb a liquid contaminant. It is especially applicable to a liquid surface such as that of a sea, a lake or a water course, on which contaminating products have been unfortunately spilt. It is also applicable to a solid surface, such as a ground onto which a machine (for example, a lathe or a milling machine) allows oil to escape. This process is more particularly applicable in the case where the contaminating product is a petroleum product, especially a hydrocarbon, a lubricant or hydraulic fluid.

To make use of the process according to the invention, the number of bags to be employed will have to be adapted as a function of the precise nature of the petroleum hydrocarbons spread on the contaminated surface. In fact, the absorption capacity of the agglomerated bicyclo[2.2.1]-2-heptene polymer varies greatly from one hydrocarbon fraction to another. The absorption capacity generally goes up to of the order of 1 to 10 parts by weight of hydrocarbon per 1 part of polymer in the case of heavy hydrocarbons, as mentioned in the French Patent No. 2,288,709. It has surprisingly been found that the adsorption capacity can go up to 40 parts by weight of hydrocarbons per 1 part by weight of agglomerated polymer in the case of transformer oils and lighter hydrocarbons such as domestic fuel oil, benzene, toluene and xylene. According to an embodiment of the process according to the invention, the number of textile bags arranged on the contaminated surface, when the contaminating product is a petroleum product, is therefore chosen so as to make the quantity of agglomerated polymer contained in all the bags between 1/40 and 1 times the quantity of contaminating product to be absorbed.

The time needed to absorb the contaminating products using the agglomerated polymer contained in the textile bag depends, on the one hand, on the chemical nature of the contaminating products and, on the other hand, on their manner of distribution, compact or dispersed, on the contaminated surface. Insofar as these petroleum products are concerned, this time depends on the fact of knowing whether heavy or light hydrocarbons are involved. In the latter case, this time is generally between 5 seconds and approximately 1 hour at ambient temperature. In all cases, the time needed to absorb the contaminating products using the agglomerated polymer is advantageously shorter than the time needed when using an unagglomerated polymer powder.

Once the essential part of the contaminating products is absorbed by the polymer, the bag and its content can be easily removed. For example, the bags can be removed by the grasping means referred to above, without any risks of sweating-out and/or of spillage. The bags can then be taken to a permitted dumping point of an incineration site.

The examples below are given by way of illustration of the present invention. The examples are not to be considered limiting of the present invention.

EXAMPLE 1

(Comparative)

A polybicyclo[2.2.1]-2-heptene marketed by Norsolar under the trademark Norsorex is screened on a screen 0.1 mm in size. The oversize material, with a particle size of between 0.1 and 0.8 mm has 1% of stearic acid added to it. 500 g of this mixture, with a bulk density of 0.40, are introduced into a polyester textile bag 1 meter in length and 55 mm in diameter. The two ends of the bags are closed by means of metal rings.

At the end of a time $t_1$ (expressed in days) after its manufacture, this bag is arranged in a catch trough 120 cm in length and 30 cm in width, containing 1.5 kg of domestic fuel oil. The fuel oil is progressively absorbed by the content of the bag. At the end of a time $t_2$ (expressed in minutes) after the initial contact, all the fuel oil has migrated and is imprisoned in the bag. The bottom of the catch trough is virtually completely dry.

The bag and its content can be removed without risk of sweating out or of spillage. The same observation can be made when the same quantity of domestic fuel oil is spread on the surface of a trough containing water. The time $t_2$ observed as a function of time $t_1$ is shown in Table I below.

TABLE I

| $t_1$ | 8 | 180 | 360 |
| --- | --- | --- | --- |

TABLE I-continued

| $t_2$ | 30 | 65 | 180 |
|---|---|---|---|

EXAMPLE 2

A mixture of 100 parts by weight of polybicyclo[2.2.1]-2-heptene marketed under the trademark Norsorex, containing 1% of stearic acid, with 15 parts by weight of a naphthenic petroleum oil marketed by the Nynas Company under the trademark Nytex 00, is produced in a powder mixer known as a planetary mixer, at ambient temperature.

After 10 minutes of mixing, the polymer has absorbed the oil and is in the form of 0.5 to 2-mm particles and has a bulk density of 0.30.

575 g of this mixture are introduced into a bag identical with that of Example 1. After closing the ends of the bag, the latter is subjected to the absorption test of Example 1. The time $t_2$ observed as a function of time $t_1$ is shown in Table II below.

TABLE II

| $t_1$ | 8 | 180 | 360 |
|---|---|---|---|
| $t_2$ | 19 | 21 | 23 |

EXAMPLE 3

The procedure of Example 2 is reproduced with the following exception: the quantity of naphthenic petroleum oil employed is 30 parts by weight instead of 15 parts.

Under these conditions, the mixture is in the form of 0.5 to 10 mm particles and has a bulk density of 0.25. The time $t_2$ observed as a function of time $t_1$ is shown in Table III below.

TABLE III

| $t_1$ | 8 | 180 | 360 |
|---|---|---|---|
| $t_2$ | 15 | 17 | 20 |

What is claimed is:

1. A decontaminating article comprising:
   (a) a preagglomerated, powdered polymer of bicyclo[2.2.1]-2-heptene or its methyl derivative, and
   (b) at least one fine-mesh textile bag at least partially filled with the polymer.

2. The article according to claim 1, wherein the polymer is agglomerated with a plasticizing agent.

3. The article according to claim 2, wherein the plasticizing agent is selected from the group consisting of: liquid hydrocarbons; petroleum, paraffinic, aromatic and naphthenic oils; phthalates; adipates; sebacates; and alkylbenzenes.

4. The article according to claim 2, wherein the proportion of the plasticizing agent relative to the polymer is between 0.5 and 50% by weight.

5. The article according to claim 1, wherein the bag comprises at least one grasping means permitting the bag to be pulled or towed by mechanical means.

6. The article according to claim 1, wherein the polymer contained in the bag has a particle size of between 0.5 and 20 mm.

7. The article according to claim 1, further comprising at least one other absorbent agent mixed with the powdered polymer.

8. A process for absorbing a liquid contaminating product comprising the step of: arranging on the surface of the liquid at least one fine-mesh textile bag at least partially filled with a preagglomerated, powdered polymer of bicyclo[2.2.1]-2-heptene or its methyl derivative.

9. The process according to claim 8, wherein the liquid contaminating product is a petroleum product.

10. The process according to claim 9, wherein the number of bags is chosen to make the quantity of powdered polymer contained in all the bags between 1/40 and 1 times the quantity of contaminating product to be absorbed.

11. The process according to claim 8, wherein the polymer is agglomerated with a plasticizing agent.

12. The process according to claim 11, wherein the plasticizing agent is selected from the group consisting of: liquid hydrocarbons; petroleum, paraffinic, aromatic and naphthenic oils; phthalates; adipates; sebacates; and alkylbenzenes.

13. The process according to claim 11, wherein the proportion of the platicizing agent relative to the polymer is between 0.5 and 50% by weight.

14. The process according to claim 8, wherein the bag comprises at least one grasping means permitting the bag to be pulled or towed by mechanical means.

15. The process according to claim 8, wherein the polymer contained in the bag has a particle size of between 0.5 and 20 mm.

16. The process according to claim 8, wherein the bag further comprises at least one other absorbent agent mixed with the powdered polymer.

* * * * *